April 14, 1931. V. A. BOKER 1,801,069
GREASE GUN
Filed May 4, 1929
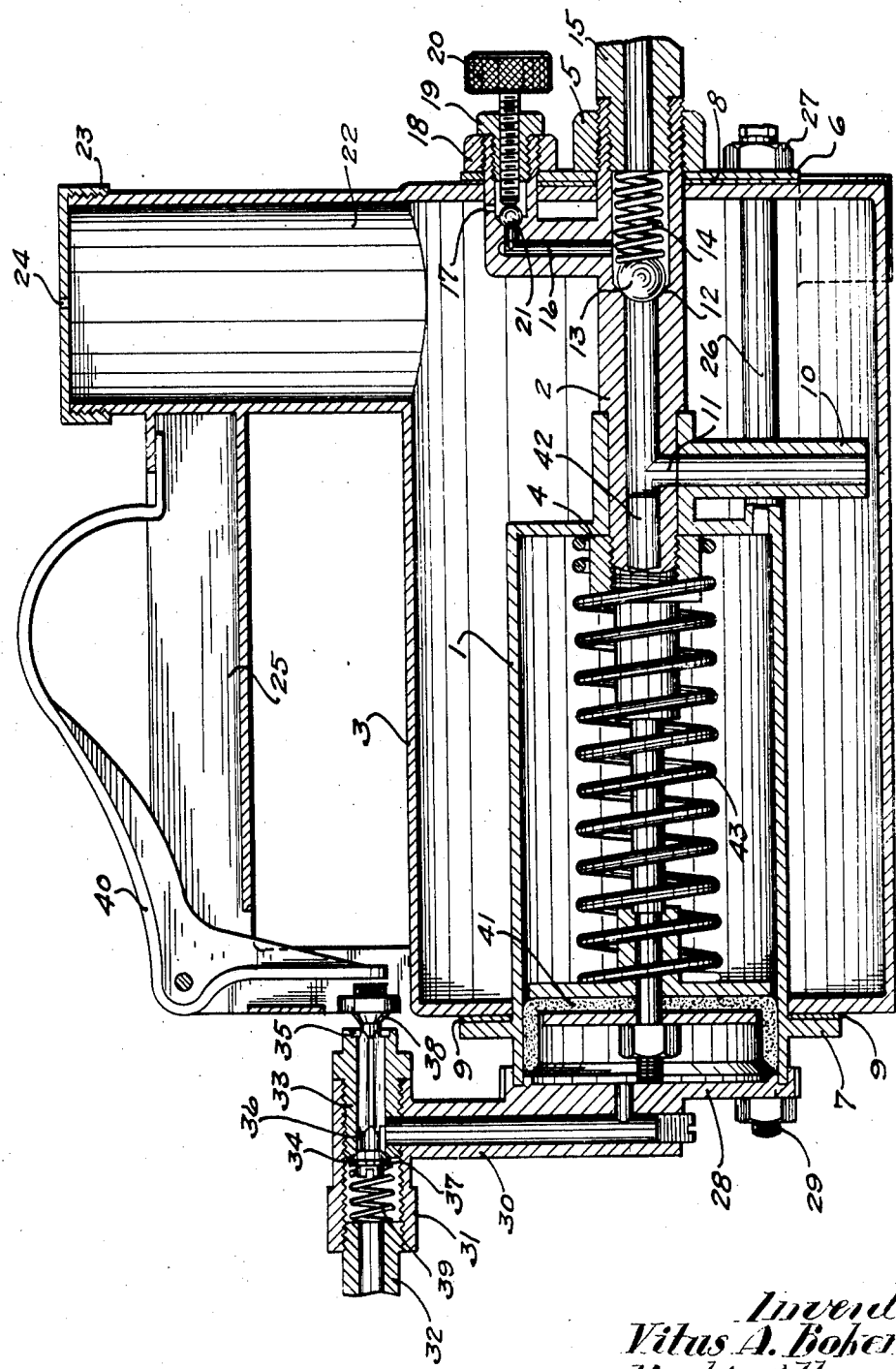
Inventor
Vitus A. Boker
By his Attorneys
Merchant & Kilgore Patented Apr. 14, 1931

1,801,069

UNITED STATES PATENT OFFICE

VITUS A. BOKER, OF MINNEAPOLIS, MINNESOTA, ASSIGNOR TO MIN-A-MAX CO., OF MINNEAPOLIS, MINNESOTA, A CORPORATION OF MINNESOTA

GREASE GUN

Application filed May 4, 1929. Serial No. 360,527.

My present invention relates to devices for delivering grease, under a high pressure, to the bearings of automobiles and to various other places that are to be lubricated. Devices of this kind are quite generally known to the trade as grease guns.

Generally stated, the invention consists of the novel devices, combinations of devices and arrangement of parts hereinafter described and defined in the claim.

The invention is illustrated in the single view of the drawing which is a perspective showing the improved grease gun in vertical axial section.

In the preferred embodiment of the invention here illustrated, the grease gun proper is of the differential cylinder and piston type and includes connected axially aligned relatively large and small cylinders 1 and 2, both of which are contained within, but project through the heads of a surrounding grease-containing tank 3. Preferably the cylinders 1 and 2 are separately formed, the latter being telescoped through one end of the former and having screw-threaded engagement with a nut 4 that clamps the two cylinders rigidly together and in axial alignment. The projecting end of the small cylinder 2 is externally threaded and provided with a clamping nut 5, which, when tightened, draws a clamping plate 6 against the adjacent end of the tank 3 and draws a flange 7 on the outer end of the cylinder 1 against the opposite end of said tank. Preferably, a pliable gasket 8 is interposed between the plate 6 and the adjacent end of the tank 3 and the gasket 9 is interposed between the flange 7 and the adjacent end of said tank so that fluid-tight joints are thus formed between the cylinders and the tank.

To afford a grease intake passage to the receiving end of the small high pressure cylinder 2, the projecting sleeve-like portion of the cylinder 1, as shown, is provided with a depending intake tube 10 that communicates with the cylinder 2 through a port 11. The bore in the cylinder 2 is enlarged at its outer portion so as to afford a valve seat 12 against which an outwardly opening check valve in the form of a ball 13 is normally seated by a coiled spring 14. The outer end of the spring 14 is seated against the inner end of a discharge pipe 15, the threaded end of which is screwed into the extended end of said cylinder 2. This discharge tube 15 may be assumed to be the receiving section of a jointed metallic grease delivery pipe. Cylinder 2 is provided with an extended tubular elbow 16 that is provided with a relief port 17 that opens into the interior of the grease tank or container 3, for an important purpose which will hereinafter appear. In the arrangement shown, the end of the elbow 16 is extended outward through the adjacent end of the tank 3 and through the plate 6 and gasket 8 and is provided with a nut 18 which, when tightened, insures a tight joint between the elbow and head of the tank. The outer end of the elbow 16 is closed by a screw-threaded plug 19 through which works the stem of a valve-locking screw 20. When this screw 20 is tightened, it engages an outwardly opening check valve 21 and locks the same against a seat formed in the elbow 16 between its relief port 17 and its receiving end.

The tank 3, as shown, is provided with a raised dome 22, the top of which is closed by a cap 23 having a small air vent 24 that permits atmospheric pressure to be effective on the grease within said tank. Also as shown, the tank is provided on top with an L-shaped handle structure 25 that is attached to the top of the tank and to the dome 22. The numeral 26 indicates a breather tube that extends from the front end of the cylinder 1, through the front end of the tank 3, and through the plate 6 and gasket 8, so that atmospheric pressure will always be active in the front end of the cylinder 1. A nut 27 applied on the projecting end of the breather tube 26 serves when tightened, to cause a tight joint to be formed between the breather tube and the front end of the tank.

The projecting rear end of the tank 3 is closed by a head 28 that is rigidly but detachably secured in position by nut-equipped bolts 29 that are suitably anchored to the tank 3. The head 28 is shown as provided with a hollow upwardly extended neck 30 that terminates in a tubular head 31. The conduit of neck 30 at its lower portion opens through head 28 into the outer or rear end of the cylinder 1. The rigid delivery section 32 of a flexible compressed air delivery pipe is shown as screwed into the receiving end of the head 31 and into the other end of said head is screwed a tubular valve sleeve 33 that is formed with inner and outer valve seats 34 and 35. A ribbed valve stem 36 is slidably mounted in and works through the valve sleeve 33 and is provided with valve heads 37 and 38 that are engageable alternately and respectively with the valve seats 34 and 35. A coiled spring 39 compressed between the valve head 37 and the pipe section 32 normally holds valve head 37 against seat 34 and valve head 38 away from valve seat 35, as shown in the drawing. For moving the valve structure just described against the tension of the spring 39 so as to compress valve head 38 against valve seat 35 and move valve head 37 away from valve seat 34, there is provided a hand-operated valve-actuated lever 40 that is pivoted to the hand-piece 25, as clearly shown in the drawing.

Working in the differential cylinder, above described, is a differential piston which, as shown, comprises a head-like piston 41 that works in cylinder 1, and a relatively small-diameter rod-like piston 42 that works in the small high pressure cylinder 2. A coiled spring 43 compressed between the relatively large piston 41 and the front end of the cylinder 1 normally holds the differential piston retracted, as shown in the drawing, by reference to which it will be noted that piston 41 is at the outer end of cylinder 1 and that piston 42 is so retracted that its front end will be back of its receiving port 11.

When the device is prepared for use, more or less grease in liquid or semi-liquid form will be contained within the tank 3 and check valve 21 will be pressed to its closed position so as to cut off discharge from the enlarged front portion of the cylinder 2, except outward through the grease discharge pipe 15. When the differential piston makes a return or rearward movement from its forward to its retracted position shown in the drawing, under the action of the spring 43, check valve 13 being then closed a partial vacuum will be produced in the front portion of the cylinder 2 so that the grease will be drawn from the bottom of the tank upward through tube 10 and port 11 into the cylinder 2 in front of the retracted piston 42. Such return movement of the differential piston, under the action of the spring 43, will take place under normal position of the control valve, which in its normal position shown in the drawing, cuts off the supply of compressed air and permits a free flow of air from the rear end of the cylinder 1 outward through port 35.

When the upper portion of the lever 40 is depressed, valve head 38 will be forced against valve seat 35, thereby closing the latter, and valve head 47 will be pressed away from valve seat 34, thereby permitting air under pressure to be delivered into the rear end of cylinder 1 and against the relatively large piston 41. Compressed air thus delivered against piston 41 will exert all of its force on the small-diameter piston 42 so that relatively very high pressure will be produced on the grease contained in the front end of cylinder 2 and the grease thus under high pressure will be delivered past the check valve 13 and out through the pipe 15 and its extended sections to the journal or part to be lubricated. As already indicated, the differential piston and the double-ended control valve, will be automatically restored to their normal positions shown in the drawing, immediately upon release of the lever 40. Obviously, the lever 41 is so related to the handle 25 that the grease gun can be carried and operated by one hand.

As is well known, it is common practice to connect the nozzles and nipples of these grease delivery guns by interlocking devices that either cannot be released or can be released only with great difficulty while they are under the very high pressure produced by the delivery of grease from the gun and which high pressure is maintained by the check valve 13. This difficulty is obviated in a very satisfactory way in the present device by the arrangement of relief passages, ports and valve described. To relieve the grease pipe and couplings from pressure with this arrangement, it is only necessary to slightly turn outward the lock screw 20 so as to release relief valve 21 and thus permit such flow of grease from the grease pipe through the relief port 17 directly back into the tank or container 3. Thus the relief from pressure and the resulting slight discharge of grease is produced without waste or slobbering of grease outside of the apparatus.

What I claim is:—

A grease gun comprising a grease tank, relatively large and small cylinders extended within said tank, connected relatively large and small pistons working respectively in said large and small cylinders, means for producing air pressure against said large piston to cause said small piston to eject grease under high pressure, a grease supply conduit leading from said tank into said small cylinder, and a breather tube extended from the inner portion of said large cylinder to the atmosphere, said breather tube forming a longitudinal extension of said relatively large cylinder and together with said cylinder forming a brace or tie connection between the heads of said grease tank.

In testimony whereof I affix my signature.

VITUS A. BOKER.